United States Patent

Biegelsen et al.

[19]

[11] Patent Number: 6,089,534
[45] Date of Patent: Jul. 18, 2000

[54] FAST VARIABLE FLOW MICROELECTROMECHANICAL VALVES

[75] Inventors: David K. Biegelsen, Portola Valley; Warren B. Jackson, San Francisco; Patrick C. P. Cheung, Oakland; Eric Peeters, Mountain View, all of Calif.

[73] Assignee: Xerox Corporation, Stamford, Conn.

[21] Appl. No.: 09/004,520

[22] Filed: Jan. 8, 1998

[51] Int. Cl.[7] .............................. F16K 31/06; F16K 7/00
[52] U.S. Cl. ...................................... 251/129.01; 251/331
[58] Field of Search .............................. 251/331, 129.01, 251/129.02; 137/487.5

[56] References Cited

U.S. PATENT DOCUMENTS

| | | | |
|---|---|---|---|
| 3,243,181 | 3/1966 | Lyman | 271/195 |
| 3,405,977 | 10/1968 | Albright | 271/195 |
| 3,414,331 | 12/1968 | Fogg | 406/88 |
| 3,422,411 | 1/1969 | Smith, Jr. | 271/195 |
| 3,437,335 | 4/1969 | Gluskin | 271/195 |
| 3,550,964 | 12/1970 | Spyropoulos | 406/19 |
| 3,918,706 | 11/1975 | Craft | 271/195 |
| 4,493,548 | 1/1985 | Ateya | 355/3 FU |
| 4,577,854 | 3/1986 | Bachman et al. | 271/227 |
| 4,618,292 | 10/1986 | Judge et al. | 406/19 |

(List continued on next page.)

FOREIGN PATENT DOCUMENTS

| | | | |
|---|---|---|---|
| 214554 | 8/1989 | Japan | 271/227 |
| 243418 | 9/1990 | Japan | 406/19 |
| 2226538 | 7/1990 | United Kingdom | 271/195 |
| 2275903 | 9/1994 | United Kingdom | 406/19 |

OTHER PUBLICATIONS

Konishi, S. et al., A Conveyance System Using Air Flow Based on the Concept of Distributed Micro Motion Systems. Journal of Microelectromechanical Systems, vol. 3, No. 2, Jun. 1994, pp. 54–58.

Konishi, S. et al., System Design for Cooperative Control of Arrayed Microactuators. Proceedings of the IEEE Micro Electro Mechanical Systems 1995, IEEE, Piscataway, NJ, USA 95CH35754, pp. 322–327.

Paivanas, J.A. et al., Air Film System for Handling Semiconductor Wafers. IBM J. Res. Develop., vol. 23, No. 4, Jul. 1979, pp. 361–375.

Micro Electrical Mechanical Systems, sponsored by IEEE Robotics & Automation Society and ASME Dynamic Systems & Control Division, presented Jan. 29–Feb. 2, 1995 in Amsterdam, Netherlands, By: Legtenberg, Berenschot, Elwenspoek and Fluitman, Title: "Electrostatic Curved Electrode Actuators", pp. 37–42, IEEE Catalog No. 95CH35754.

A Low Power, Tight Seal, Polymide Electrostatic Microvalve, paper, presented Nov. 17–Nov. 22, 1996 in Atlanta, GA, by: Abraham P. Lee, Julie Hamilton, and Jimmy Trevino of the Lawrence Livermore National Laboratory Microtechnology Center, Livermore, CA.

*Primary Examiner*—Kevin Shaver
*Assistant Examiner*—Eric Keasel
*Attorney, Agent, or Firm*—Robert A. Burtzlaff

[57] ABSTRACT

A variable fluid flow valve is disclosed. The valve can be batch fabricated in two dimensional valve arrays, with all valves in the array being controlled in parallel to achieve high flow rates without increasing response time. Typically, each valve includes a valve housing having an aperture plate defining an elongated aperture therethrough, and an opposing plate positioned in spaced apart relationship to the aperture plate. In one embodiment a flexible film or strip is attached at its first end to the aperture plate and at its second end to the opposing plate. In another embodiment of the invention, the flexible film is attached at only one end and is free to move at the other end. In both types of valves, valve action is provided by using electrodes to variably move the flexible film from an aperture blocking to an aperture non-blocking position. The flexible film may be moved in a continuously variable manner or a discretely variable manner, depending upon the electrode configuration. Binary valves in matrixes may also be used with the elongated opening.

17 Claims, 7 Drawing Sheets

U.S. PATENT DOCUMENTS

| | | | |
|---|---|---|---|
| 4,874,273 | 10/1989 | Tokisue et al. | 406/19 |
| 5,082,242 | 1/1992 | Bonne et al. | 251/129.01 |
| 5,284,179 | 2/1994 | Shikida et al. | 37/334 |
| 5,417,235 | 5/1995 | Wise et al. | 251/129.01 |
| 5,441,597 | 8/1995 | Bonne et al. | 216/2 |
| 5,497,987 | 3/1996 | Henn et al. | 406/88 |
| 5,897,097 | 4/1999 | Biegelsen et al. | 251/129.01 |
| 5,901,939 | 5/1999 | Cabuz et al. | 251/129.02 |

FAST VARIABLE FLOW MICROELECTROMECHANICAL VALVES

FIELD OF THE INVENTION

The present invention relates to electronically actuated valves suitable for variably controlling fluid flow. More specifically, the present invention relates to valves for rapidly controlling high flows at low pressures with particular utility for paper handling applications.

BACKGROUND AND SUMMARY OF THE INVENTION

High speed electronic variable control of fluid flow using inexpensive batch fabricated valve arrays is potentially critical for numerous applications, including distributed actuator controls, paper or object positioning, dynamic control of fluid instabilities, or microcontrol of microchemical reactions and biological assays. Other potential applications include use of valves to drive physical elements that support tactile displays or other virtual reality interface tools. Gray level control valves provide greater control of fluid flow and are therefore more desirable than binary control valves. Also high speed valves with high throughput are difficult to manufacture inexpensively due to the large energy required to drive a massive mechanism.

By creating an array of small valves, variable high speed flow control is more easily and inexpensively obtainable and the throughput of the array in parallel allows unlimited throughputs. Matrix addressing may or may not be necessary depending on the number of flow levels and flows needed.

Each valve includes a valve housing having an aperture plate defining an aperture therethrough, and an opposing plate positioned in spaced apart relationship to the aperture plate. In one embodiment, a flexible electrically conductive film or strip is attached at its first end to the aperture plate and at its second end to the opposing plate. In another embodiment, a flexible electrically conductive film or strip is attached at one end and is free to move at the other end. In both embodiments, valve action is provided by use of switching electrodes for variably moving the flexible film between an aperture blocking position and an aperture open position. The aperture is an elongated opening, the operative size of which can be continuously varied or discretely varied by varying the voltage applied to the electrodes to control the movement of the film.

The valves of the present invention may be configured in an array of high speed valves which allows for high speed, high resolution, contactless transport of objects, including flexible objects such as paper. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper. Fortunately, mechanical or frictional engagement is only one possible means for moving an object. Object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by valve controlled air jets. This is particularly advantageous, for example, when sheets of paper carrying unfixed toner images must be moved between a photoconductive drum and a fusing station where the toner image is fixed. With conventional physical rollers, the continuing possibility of dynamic distortions to the toner image, or even slight misalignments resulting in image degradation, must always be considered.

Additional functions, objects, advantages, and features of the present invention will become apparent from consideration of the following description and drawings of preferred embodiments.

DETAILED DESCRIPTION OF THE INVENTION

Figure 1:
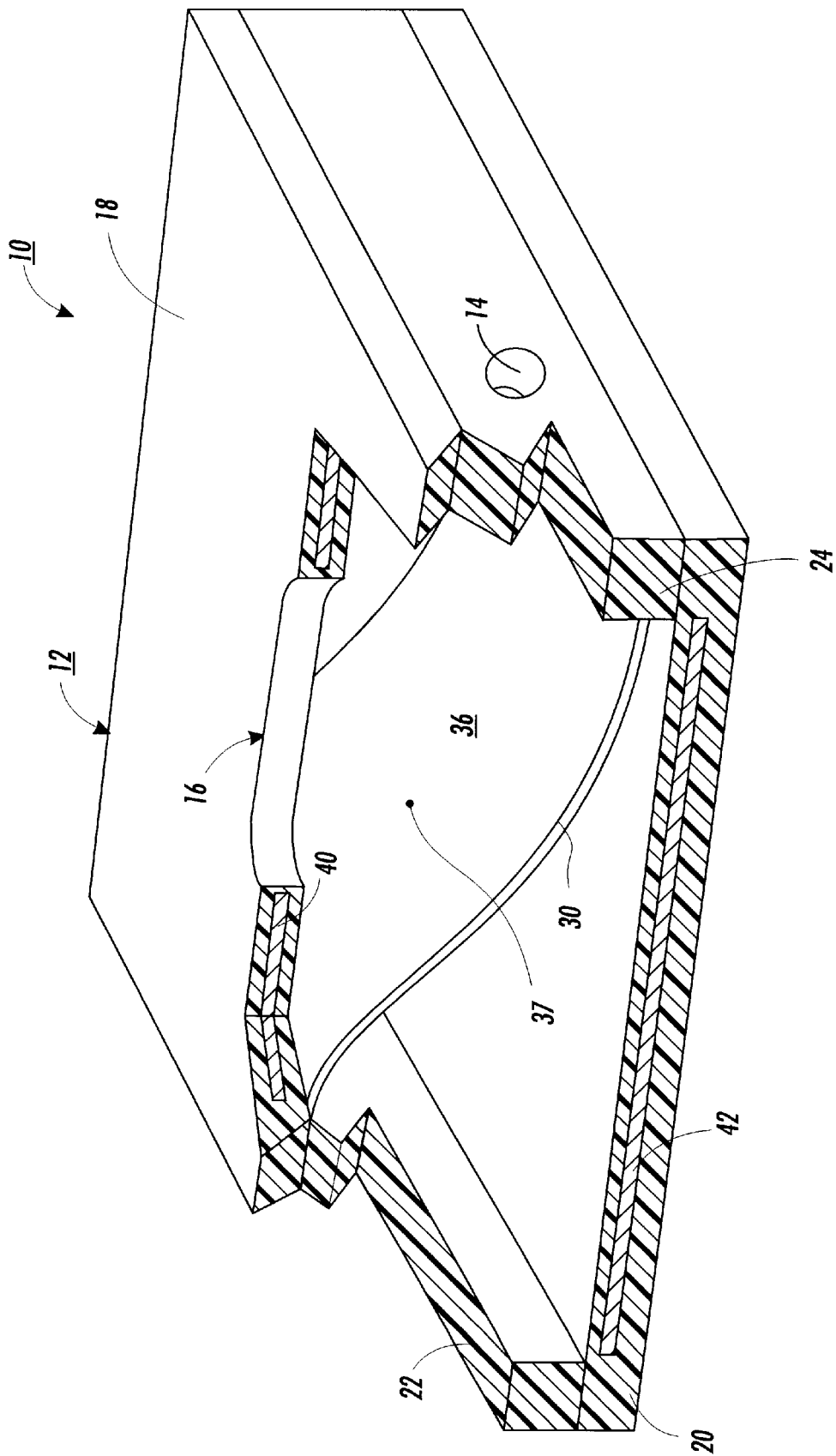
FIG. 1 illustrates a valve in accordance with the present invention in partially cut away perspective view, showing an S-shaped film moving from an aperture blocking position to a non-blocking position.

A valve 10 according to one embodiment of the present invention is illustrated in partially cut away perspective view in FIG. 1. The valve 10 includes a valve housing 12 that defines a port 14 and an elongated aperture 16 for variable inlet or outlet of fluid. In the illustrated embodiment the port 14 is best configured as an inlet port for pressurized air, while the elongated aperture 16 is a selectively blockable outlet. However, as those skilled in the art will appreciate, inlets and outlets can be reversed or repositioned as necessary for best operation.

The valve housing 12 is formed from an aperture plate 18 (defining the elongated aperture 16), an opposing plate 20 positioned in spaced apart parallel relationship to the aperture plate 18, and spacers 22 and 24 positioned between the plates 18 and 20. In the illustrated embodiment, each of these structural elements (plates 18 and 20, spacers 22 and 24) are separately formed as distinct layers that are later bonded together, however, it is of course possible to use micromachining, plastic deposition, stereolithography or other techniques to form unitary structures.

A flexible film 30 is sandwiched between the plates 18 and 20. As illustrated, the film 30 has a film body 36a first fixed film end 32 and a second fixed film end 34. First fixed film end 32 is pinned in position between plate 18 and spacer 22, while second fixed film end 34 is pinned between plate 20 and spacer 24. Because the length of the film is greater than the point to point distance between the fixed film ends, in side view the film body 36 is not straight, but instead forms a generally S-shaped curve. The center 37 of this S-curve is not fixed, but can move between a position near spacer 24, to a position near spacer 22. In the illustrated embodiment of FIG. 1, the center 37 of film 30 is about midway between spacers 22 and 24, in a position that does not block aperture 16.

To reliably switch the flexible film between an aperture 16 blocking position and an aperture non-blocking position, and vice-versa, requires use of electrodes 40 and 42 respectively embedded in plates 18 and 20. Electrodes 40 and 42 are switching electrodes that pull the flexible, conducting film toward one or the other plates 18 and 20, depending upon the voltage applied thereto Valve 10 can be constructed with a variety of machining or micromachining techniques, including those associated with conventional integrated circuit or printed circuit board fabrication. For example, chemical etching, electron beam lithography, photolithography, or other standard integrated circuit batch processing technologies can be used to define necessary air conduits, control or circuitry conduits, holes, orifices, and apertures. Alternatively, injection molding, high precision numerically controlled machines, or stereolithography can be employed for low cost batch construction of valves. Materials used in construction may include plastics, metals, glasses, or ceramics. In one possible embodiment, plastics, epoxies, glass, silicon, polysilicon, silicon nitride, silicon, silicon oxide, oxynitride, plastics or aluminum, or any other available material suitable for lithographic processing can be used to define the necessary valve housing, valve structures, or conduits. Electrodes can be any conductive metal or polymer, while the flexible strip can be constructed from plastic films, aluminum coated mylar, plated nickel, or polyimide sandwiched aluminum. In typical applications, the housing of each valve will be less than 100 cubic millimeters in volume (10×10×1 millimeters), while the flexible strip in the valve housing will generally have dimension on the order of 0.1 to 10 millimeters in width, 0.5 to 50 millimeters in length, and 1 to 100 microns in thickness. Large arrays of the valves car, be constructed, with meter scale arrays having tens of thousands of individual valves being contemplated.

Figure 2:
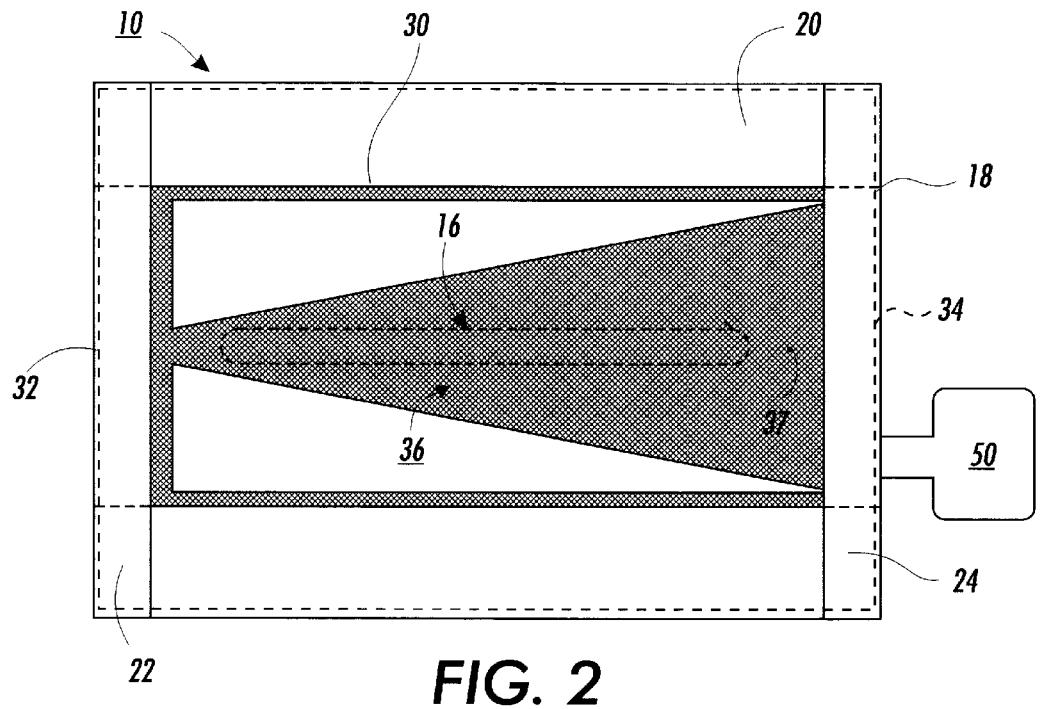
FIG. 2 is a top view of the valve of FIG. 1.
Figure 3:
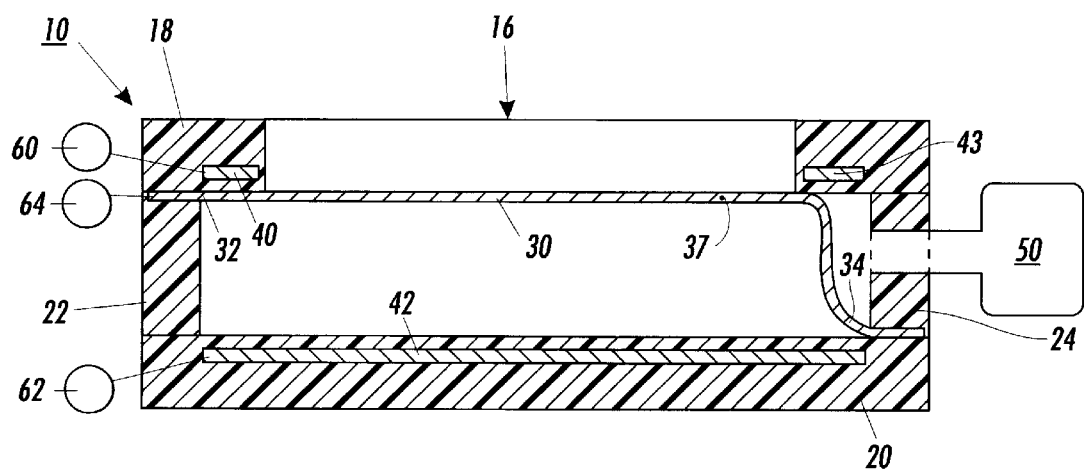
FIG. 3 is a side cross sectional view of the valve of FIG. 1 and 2, with the S-shaped film shown in an aperture blocking position.

Operation of valve 10 is best discussed in connection with FIGS. 2, 3, and 4. As seen in FIG. 2, a fluid pressure source 50 is connected to the valve. The fluid pressure source can be provided by a fan, blower or other pressurized air source, or any other conventional device suitable for modifying available fluid pressure. Alternatively, vacuum source can be connected to aperture 16 to exhaust fluid through the valve. The fluid pressure source (typically filtered air) enters valve 10 and exits through elongated aperture 16, unless elongated aperture 16 is blocked by film 30, as seen in cross section in FIG. 3. Electrode 40 is connected to voltage source 60, electrode 42 is connected to voltage source 62, and film 30 is connected to voltage source 64 or grounded. In this view, voltage source 60 is at the full switching voltage to maintain the film in the aperture blocking position while voltage source 62 is at its minimum voltage and voltage source 64 is the same as voltage sources 62 or grounded.

Figure 4:
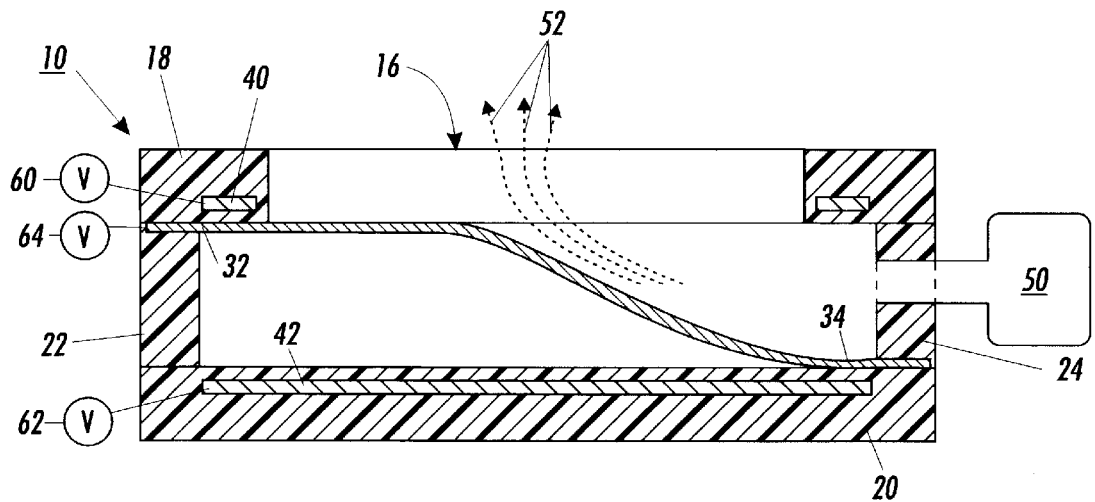
FIG. 4 is a side cross sectional view of the valve of FIG. 1 and 2, with the S-shaped film partially pulled down against an opposing plate by electrostatic interaction with electrodes into an aperture partially non-blocking position.

To variably unblock the elongated aperture 16, as seen in FIG. 4, the switch electrodes and voltage source 64 connected to the film 30 are activated to provide a substantial voltage differential (typically 25–150 volts, depending on valve dimensions and fluid pressure) between the film 30 and the position on the switching electrodes 40 and 42 to provide the desired aperture opening. Electrostatic attraction induces the center 37 of the S-shaped film 30 to move away from spacer 24 toward the spacer 22. This movement is aided by the outflow 52 of pressurized fluid (air) through elongated aperture 16. Voltage 60 is decreased, or preferably set to zero and voltage 62 is increased until the desired aperture size is obtained. Varying voltage sources may be accomplished in many different ways. In the example shown, electrodes 40 and 42 are tapered which provide s spatially varying electrostatic forces with varying voltage. The film 30 is maintained in the partially non-blocking position in part by differential electrostatic attractive forces between the film 30 and electrodes 40 and 42, maintained at differential voltages with respect to the film 30 by a voltage sources 60 and 62. The film moves to the unblocking position as the voltage differential between electrode 40 and the film decreases and the voltage differential between electrode 42 and the film increases. Feedback from a flow measuring device (not shown) could be used to adjust the electrode voltages to precisely achieve a desired flow.

Figure 5:
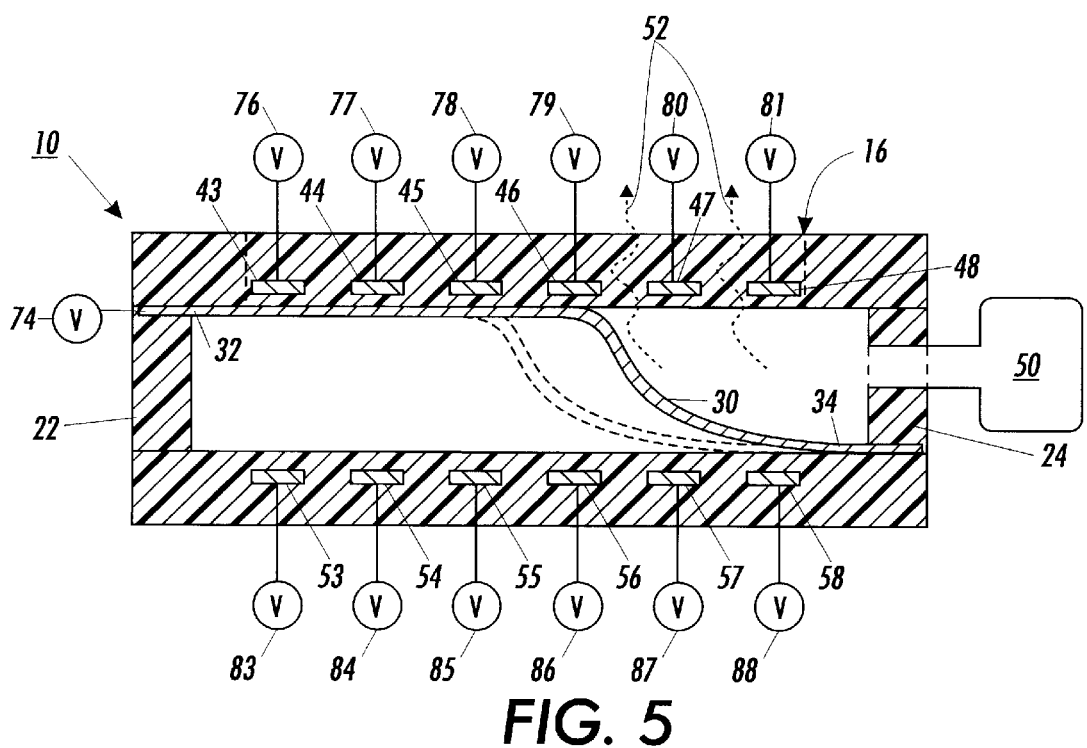
FIG. 5 is a side cross sectional view of a discretely variable S-shaped film valve as the valve moves from a first position to a second position.

FIG. 5 illustrates a discretely variable version of the valve. Upper electrodes 43, 44, 45, 46, 47 and 48 have voltage sources 76, 77, 78, 79, 80 and 81 respectively attached thereto or a single voltage source with switches to connect voltage to the electrodes and are associated with aperture plate 18. Lower electrodes 53, 54, 55, 56, 57 and 58 have voltage sources 83, 84, 85, 86, 87 and 88 respectively attached thereto and are associated with opposing plate 20. Of course, the number of electrodes and voltage sources may be more or less than the number shown in the drawings, depending upon the number of intermediate flows necessary. In operation, a controller applies a voltage difference, also known as the switching voltage, between the film and top electrodes 1 through n and sets the voltage difference between the film and electrodes (n+1) through N to zero, where n is the last switched electrode and N is the total number of electrodes. Simultaneously lower electrodes 1 through n are set to zero voltage difference and lower electrodes (n+1) through N are set to the switching voltage. The S-wave therefore shifts to the gap between strips n and (n+1) in the direction shown by the arrow.

In FIG. 5, voltage sources 76, 77, 78 and 79 are initially at the switching voltage which causes the film to move to upper electrodes 43, 44, 45 and 46 and voltage sources 80 and 81 are set at 0 voltage differential. Voltage source 70 is connected to film 30. Voltage sources 53, 54, 55 and 56 are initially at the 0 voltage differential to lower electrodes 83, 84, 85 and 86, while voltage sources 87 and 88 are initially at the switching voltage which causes the film to move towards lower electrodes 57 and 58. To move the film from the first position indicated by the solid lines to the second position indicated by the dashed lines, the voltage on voltage source 79 is changed from the switching voltage to 0 voltage differential and the voltage on voltage source 86 is changed from 0 voltage difference to the switching voltage; releasing the film attraction to upper electrode 46 and causing the film to be attracted to lower electrode 56. This results in an aperture which is larger than the initial aperture. The technique of changing the voltage differential between the film and upper and lower electrodes can be varied in any number of ways to control the position of the film with respect to the aperture.

Figure 6:
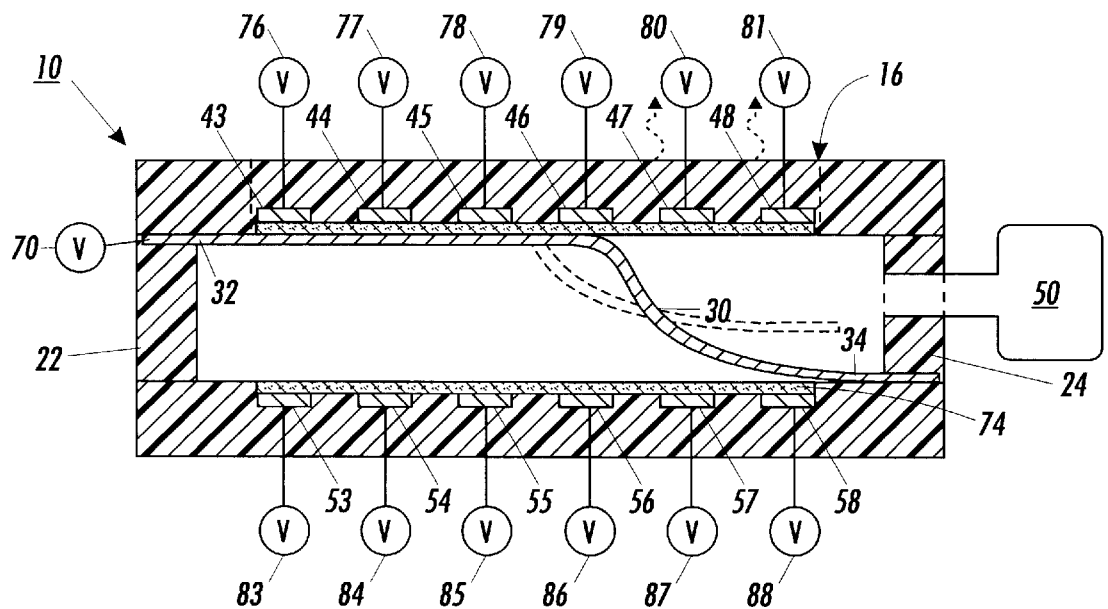
FIG. 6 is a side cross sectional view of a discretely variable S-shaped film valve, with a resistance layer connecting the voltage sources.

The embodiment shown in FIG. 6 is similar to that of FIG. 5, however the driving mechanism is different. FIG. 6 illustrates the dynamic switching case with a spatially variable blocking film in which the voltages are rapidly switched so that the film first tries to unblock and then block the aperture. If the voltage switching time is fast compared to th e film response, the film will assume an intermediate opening position. This position can be adjusted by varying the duty cycle, that is, the relative fraction of the switching period during which the voltage corresponds to opening versus closing. Thus the pulse width modulation process used to achieve a partial open position of the valve is illustrated in FIG. 6.

Figure 7:
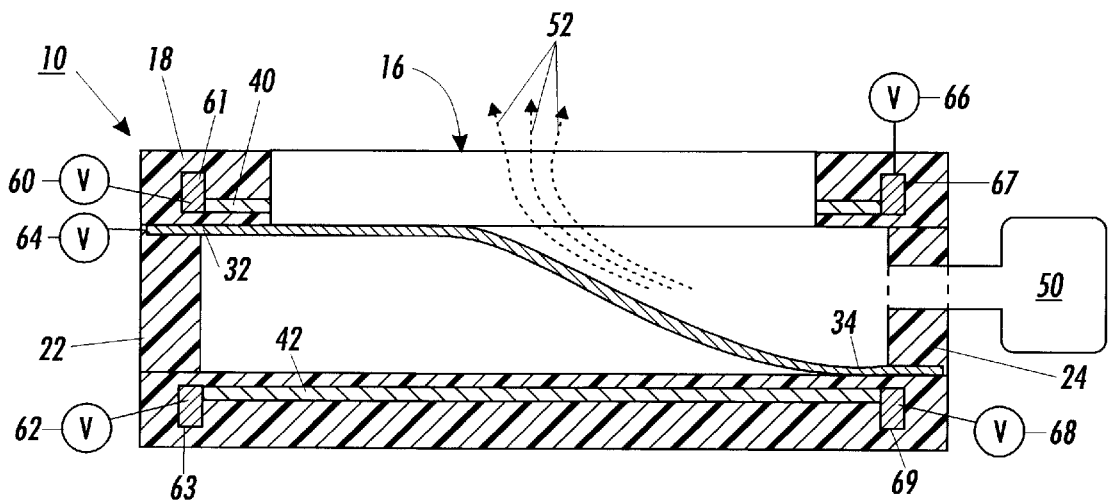
FIG. 7 is a side cross sectional view of a variable S-shaped film valve with voltage sources at each end of a resistance layer.

The description of FIG. 7 is the same as that given for FIGS. 1–4, but the top electrode consists of two conductive electrodes 61 and 67 connected by a resistance layer 40. The resistance layer may be fabricated from materials which include but are not limited to indium tin oxide, doped poly or doped amorphous silicon. Similarly, the bottom electrode consists of two conductive electrodes 63 and 69 connected by resistance layer 42. If voltages 62, 64, 66 and 68 are held at ground while voltage 60 is applied to 61, a spatially varying potential exists between electrodes 61 and 67. Near electrode 61, the flexible film would try to move to the closed position, while near electrode 67 the potential difference is near zero so the flexible film would remain in the open position. Hence, the flexible film will move until the change in electrostatic energy balances the changes in elastic, frictional and fluid energy.

Figure 8:
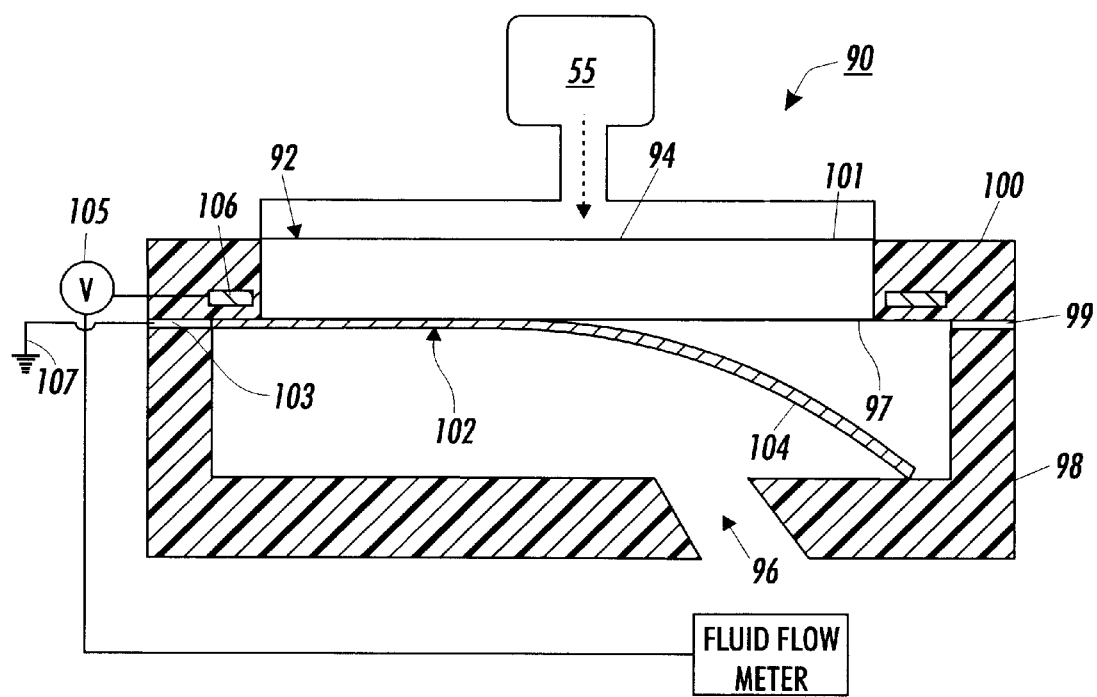
FIG. 8 is a side cross sectional view of a cantilever film valve with the cantilever film partially pulled against the port plate to partially block the aperture.

FIG. 8 is another embodiment of the invention with the valve 90 being a cantilever film valve, rather than an S-shaped film valve. The valve 90 includes a valve housing 92 that defines an elongated port 94 and an aperture 96 for inlet or outlet of fluid. In the illustrated embodiment elongated port 94 is best configured as a variably blockable inlet port for pressurized air, while the aperture 96 is an air outlet. However, as those skilled in the art will appreciate, inlets and outlets can be repositioned as necessary for best operation.

The valve housing 92 is formed from an aperture plate 98 (defining the aperture 96) and an opposing port plate 100 positioned in spaced apart parallel relationship to the aperture plate 98. In the illustrated embodiment, plates 98 and 100 are separately formed as distinct layers that are later bonded together with adhesive layer 99, however, it is of course possible to use micromachining, plastic deposition, or other techniques to form unitary structures.

A flexible conducting film 102 is sandwiched between the plates 98 and 100. As illustrated, the film 102 has a fixed film end 103 pinned in position between plates 98 and 100, while an unfixed film end 104 is free to move between plates 98 and 100.

To reliably switch the flexible conducting film 102 film between an aperture blocking position in which port 94 is blocked and an aperture open position in which port 94 is unblocked, and vice-versa, requires use of electrode 106 embedded attached to electrode 107 in plate 100 with dielectric layer 97 formed thereon. Of course, the dielectric layer can be provided on the flexible film in addition to or instead of the port plate. The electrode is a switching electrode that pulls the unfixed film end 104 toward plate 100 when a switching voltage is applied by 105. Film voltage 107, here indicated as a fixed ground voltage is attached to film fixed end 103.

The degree of closure can be determined from the electrical impedance of the valve. This method takes advantage of the fact that impedance (e.g. capacitive reactance) of the film changes monotonically as the film is moved from one end toward the other end of the valve by varying the voltage applied to the film. The impedance can be sensed and used to control the flow in a closed loop feedback mode. Alternatively, feedback signals from a fluid flow sensor 82 can be used to vary or hold the position of film 102 to maintain a desired flow by controlling time dependent signals on the electrodes.

In all of the above embodiments, various valve modifications can be employed to enhance valve operation, minimize power requirements, and decrease valve switching times. The flexible film does not have to be a straight, homogenous strip, but can be varied in composition, width, thickness, and stiffness along its length. Electrode size, positioning, and geometry can also be varied; for example, the electrodes may be tapered or there may be a plurality of electrodes. These electrode modifications, and other mechanical modifications to the flexible film, allow for tuning valve response time, decreasing or increasing valve hold-off pressure strengths, and varying electrostatic interactions.

Figure 9:
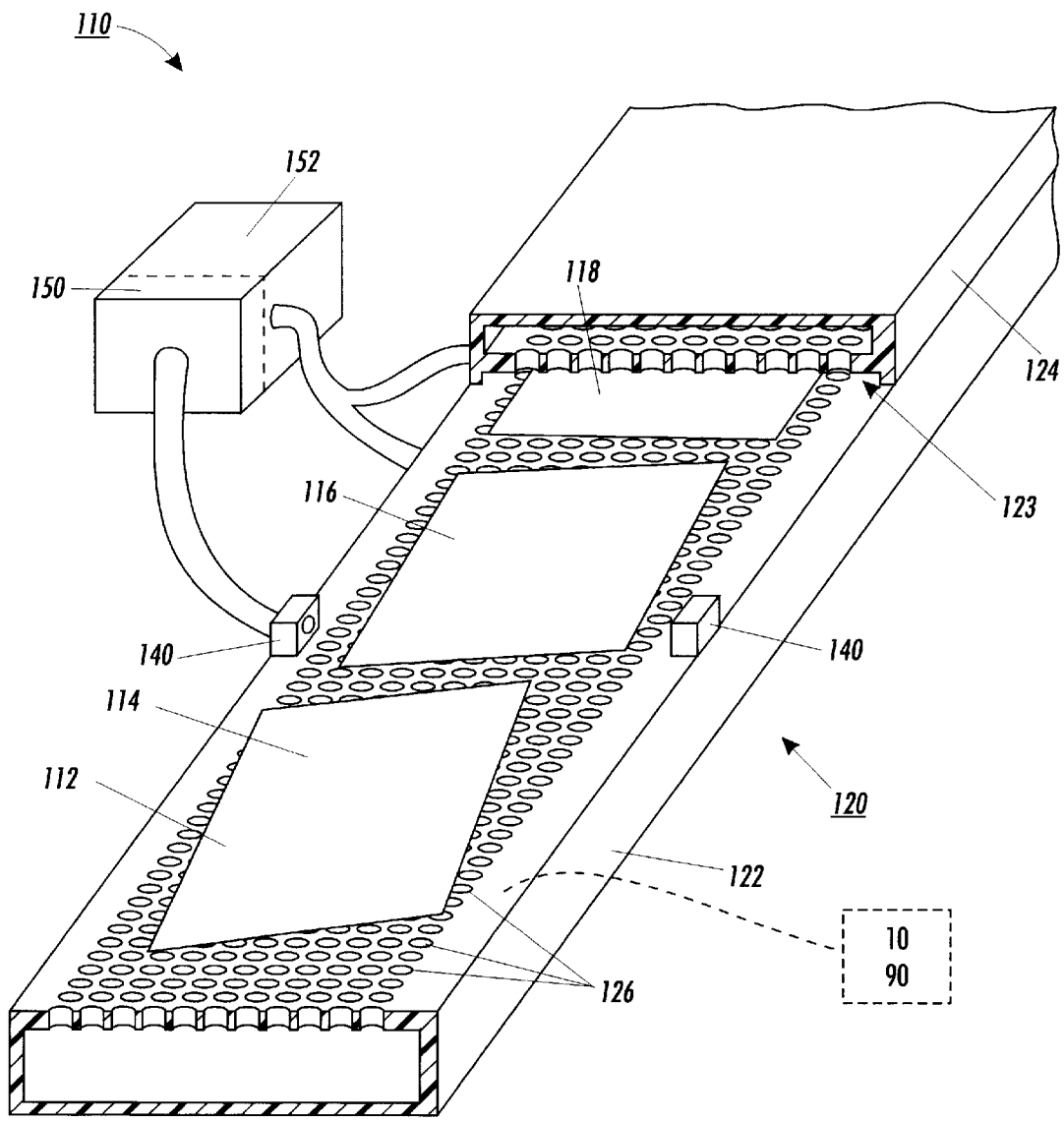
FIG. 9 illustrates a paper handling system for accurately moving air jet supported papers at high speeds using variable flow valves in accordance with the present invention, with sensor units used to detect a paper, and a movement control unit connected to the sensor units to provide appropriate corrective input to air jets to maintain the paper on a desired path, velocity, and orientation.

The valves of the present invention can be arranged in parallel arrays of gray valves for higher throughput and unchanged speed and passive matrix arrays of binary valves for the same reason. U.S. Pat. No. 5,897,097 entitled Passively Addressable Fluid Valves Having S-Shaped Blocking Films and assigned to the same assignee as the present application, hereby incorporated by reference describes arranging valves in passive matrix arrays. For example, a processing system 110 optimized for handling objects without requiring direct physical contact, including sheets of paper 112, is partially illustrated in FIG. 9. The processing system 110 has a conveyor 120, divided into a lower section 122 and a upper section 124. For clarity, the upper section 124 is cut away to better illustrate paper movement, however, it will be appreciated that the upper section 124 and lower section 122 are substantially coextensive. The sections 122 and 124 are maintained in spaced apart relationship to define a passage 123 therebetween, with the passage sized to accommodate non-contacting passage therethrough of paper 112. Each section 122 and 124 has a plurality of independently or semi-independently controlled adjustable air jets 126 for dynamically supporting, moving, and guiding paper 112 through the system 110. At least some of these air jets 126 are controlled by valves in accordance with present invention, as exemplified with reference to the valve embodiments discussed above.

Having opposed air jets in sections 122 and 124 permits adjustable application of air flow (by the directed air jets) to opposing sides of paper 112, dynamically holding the paper between sections 122 and 124, while allowing precise control of paper position, velocity, and orientation through application of vertical, lateral, or longitudinal forces (again by directed air jets). As an added advantage, the use of independent or semi-independent controlled adjustable air jets 126 allows for dynamically increasing or decreasing air flow directed against portions of paper 112, allowing straightening, flattening, curling, decurling, or other desired modification in paper topography, as well as adjustments to paper position, orientation and velocity. In addition, paper of various weights, sizes, and mechanical characteristics can be easily supported and accelerated by appropriate modification of the air flow applied by air jets 126. For example, a heavy, thick, and relatively inflexible cardboard type paper may require more air flow from the jets 126 for support and maneuvering, while a lightweight paper sheet may require less overall air flow, but may need quicker and more frequent air flow adjustments directed by the independent or semi-independent air jets 126 to compensate for flutter or edge curling effects.

Active flexible object guidance (of paper 112) to correct for flutter and other dynamic problems of flexible objects is enabled by provision of at least one sensing unit 140. The sensing unit 140 senses the motion state of paper 112, giving spatial and dynamic information (such as may be yielded from application of an optical imaging system or edge detection system) to a motion analysis unit 150 capable of calculating relative or absolute movement of paper 112 from the received information, with movement calculations generally providing overall position, orientation, velocity of paper 112, as well as position, orientation, and velocity of subregions of the paper 112 (due to flexure of the paper 112). Typically, the motion analysis unit 150 is a general purpose computer or dedicated hardware system capable of high speed image processing calculations necessary for determining object movement. Using this calculated movement information, a motion control unit 152 connected to the motion analysis unit 150 sends control signals to conveyor 120 to appropriately modify movement of paper 112 by selectively increasing or decreasing application of directed air jets to subregions of the paper 112 to reduce flutter, buckling, curling, or other undesired deviations from the desired motion state. As will be appreciated, use of discrete sensors, motion analysis units, and motion control units is not required, with integrated motion analysis and motion control assemblies being contemplated. In fact, it is even possible to provide a plurality of integrated sensors, motion analysis units, and motion control units as integrated microcontroller assemblies on the conveyor.

Whether the sensing unit 140 is discrete or integrated with microcontrollers, in order to ascertain object position properly the sensing unit 140 must be reliable and accurate, having a spatial and temporal resolution sufficient for tracking a relatively small area of the flexible object (typically at least about one square centimeter, although greater or lesser resolution is of course possible). Further, in many processes the object is moving quickly, allowing less than a 100 milliseconds for tracking measurements. Fortunately, optical sensors, video imaging systems, infrared or optical edge detectors, or certain other conventional detectors are capable of providing suitable spatial and temporal resolutions. For best results, two dimensional optical sensors (such as charge coupled devices (CCD's)), scanned one dimensional arrays, or continuous position sensitive detectors are utilized. However, fixed one dimensional sensor arrays can also be used. As will also be appreciated, contactless sensors other than optical sensors may be used, including but not limited to pressure sensors, acoustic sensors, or electrostatic sensors.

In operation, use of a sensing unit 140 for feedback control of object movement allows for precise micromanipulation of object motion state. For an illustrative example, in FIG. 9 paper 112 is sequentially illustrated in three distinct positions along conveyor 120, respectively labeled as paper position 114, paper position 116, and paper position 118. In position 114, the paper 112 arriving at the conveyor 120 is misaligned. As paper 112 is moved along conveyor 120 toward position 116 by air jets 126, the sensor 140 provides a time series of discrete spatial measurements that correspond to the instantaneous position of paper 112. These elements of a time series of spatial measurement information are continuously passed to the motion analysis unit 150. The motion analysis unit 150 uses the received information (i.e. the sensor measured one, two, or three dimensional spatial information) to accurately determine motion state of paper 112, including its position, velocity, and dynamics. This information (which may be collectively termed "trajectory") is passed to the motion control unit 152, which computes a corrective response to minimize error in trajectory and sends signals to selected air jets 126 to correct the misalignment, bringing the paper 112 closer to alignment as indicated by position 116. This feedback control process for properly orienting paper 112 by feedback controlled corrections to paper trajectory (the paper 112 now spatially located at position 1 16) is repeated, with the trajectory of paper 112 finally being correctly aligned as shown at position 118. As will be appreciated, this feedback control process for modifying the trajectory of flexible objects can be quickly repeated, with millisecond cycle times feasible if fast sensor, motion processing, and air jet systems are employed.

Advantageously, the present invention allows for manipulation and control of a wide variety of flexible objects and processes. In addition to paper handling, other flexible articles of manufacture, including extruded plastics, metallic foils, wires, fabrics, or even optical fibers can be moved in accurate three dimensional alignment. As will be appreciated, modifications in layout of conveyor 120 are contemplated, including but not limited to use of curved conveyors (with curvature either in a process direction or perpendicular to the process direction to allow for vertical or horizontal "switchbacks" or turns), use of cylindrical or other non-linear conveyors, or even use of segmented conveyors separated by regions that do not support air jets. In addition, it may be possible to construct the conveyer 120 from flexible materials, from modular components, or as interlocking segmented portions to allow for quick and convenient layout of the conveyor in a desired materials processing path.

The present invention permits ready detection and correction of trajectory, rotations, slight misalignments, three dimensional misalignments due to flutter, creases, edge turning, or other orientation problems that can be difficult to quickly detect and provide suitable movement compensation using standard material processing movement control systems. As will be appreciated by those skilled in the art, proper air jet construction and control is a critical aspect of the present invention. Typically, air jets must be constructed and positioned with respect to a flexible object to enable application of on the order of one millinewton of force to each side of the flexible object, with precise force values of course depending on material and dynamic properties of the flexible object, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course valve response times, controllers, motion analysis, and pressure conditions must also be such that air jet operation and control occurs on a millisecond time scale.

Figure 10:
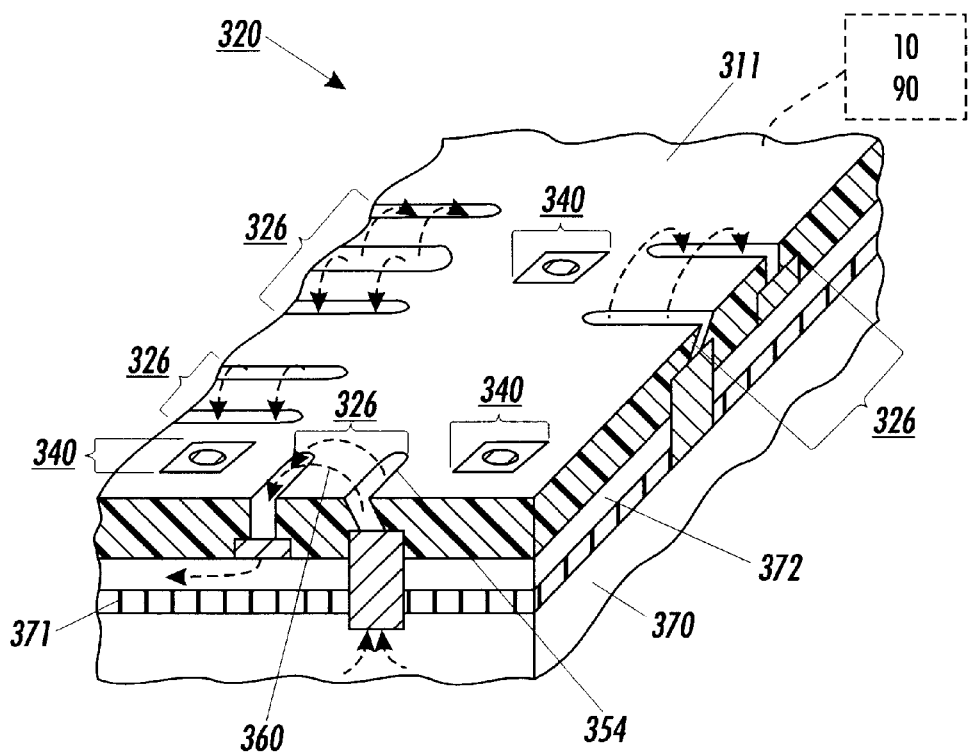
FIG. 10 is an exemplary illustration of a directed air jet system having valve controlled vertical, lateral, and longitudinal air jets, along with integrated sensor systems to enable accurate feedback controlled positioning of flexible objects in three dimensions.

A generic air jet architecture suitable for use in the present invention is illustrated with reference to FIG. 10. A portion of a flexible object conveyor 320 includes a variety of air jets 326 for enabling longitudinal, lateral, and vertical transport of flexible objects (flexible objects not shown for clarity). The air jets 326 include channels 354 defined in the conveyor surface 311 to allow exit or entrance of flowing air 360. Plenum 372 is separated from plenum 370 by partition 371, with plenum 372 being maintained at a lower air pressure than plenum 370.

Control of flexible object path is enabled by provision of a plurality of integrated sensors 340, which can include, but are not limited to, optical, mechanical, thermal, electrostatic, or acoustic sensors. The sensors 340 are used to provide near continuous sensor feedback relating to object position, which in turn allows nearly continuous movement control of flexible objects passing adjacent to the air jets 326. As will be appreciated, information received from sensors 340 can be passed to a centralized motion analysis unit and motion control unit, such as described in connection with FIG. 9. Alternatively, distributed or local motion analysis and control can be employed. For example, sensors 340 can be integrated with computer microcircuitry capable of analyzing sensor input and directing control of air jets.

Figure 11:
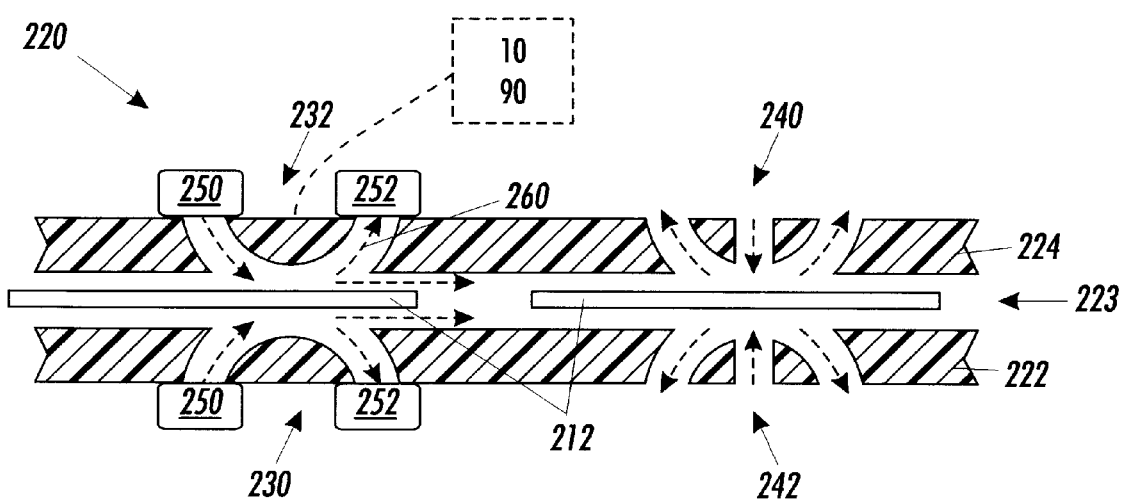
FIG. 11 is a cross section of a directed air system similar to that illustrated in FIG. 10, illustrating directed air flow patterns.

FIG. 11 is a side view of a flexible object conveyor 220 that is divided into a lower section 222 and an upper section 224, with a passage 223 therebetween, and each section 222 and 224 having a plurality of independently or semi-independently controlled adjustable air jets 230 and 232 for dynamically supporting, moving, and guiding paper 212 through the system. As previously explained in connection with FIG. 9, having opposed air jets in sections 222 and 224 permits adjustable application of air flow (by the directed air jets) to opposing sides of paper 212, dynamically holding the paper between sections 222 and 224, while allowing precise control of paper position, velocity, and orientation through application of vertical, lateral, or longitudinal forces (again by directed air jets). For example, longitudinal transport of paper 212 is encouraged by the combined action of air jets 230 and 232, positioned to oppose each other in respective sections 222 and 224. Air flow 260 is controlled by valves 250 and 252, with the air flow imparting longitudinally directed momentum to paper 212. As another example of controlling position of paper 212, opposed air jets 240 and 242 can be used to vertically direct air 260 to suspend paper 212 in a desired position in conveyor 220. This capability can even be extended to allow differential lateral or longitudinal tensioning of subregions of a piece of paper, permitting decurling, curling, reduction of flutter, or other desirable paper shaping effects.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

What is claimed is:

1. A valve comprising:
    a valve housing having an aperture plate defining an aperture therethrough, and an opposing plate positioned in spaced apart relationship to the aperture plate, the opposing plate defining a port therethrough,
    a flexible conductive film having a first end and a second end, the first end of the film being attached between the aperture plate and opposing plate,
    at least one electrode for moving the flexible film between an aperture blocked position and an aperture unblocked position; and
    at least one voltage source connected to the at least one electrode for moving the flexible film towards the at least one electrode, with applied voltage varying in response to sensed impedance of the flexible conductive film to permit maintenance of the flexible conductive film at an intermediate position between the aperture blocked and the aperture unblocked position.

2. The valve of claim 1, wherein the second end of the film is free to move between the aperture plate and the opposing plate.

3. The valve of claim 1, wherein the second end of the film is attached between the aperture plate and the opposing plate.

4. The valve of claim 1, wherein the aperture is at least twice as long as it is wide.

5. The valve of claim 1, further comprising:
    a fluid source attached to the valve.

6. The valve of claim 1, further comprising:
    a feedback control mechanism connected to a fluid flow sensor which is connected to the at least one voltage source to vary the voltage applied by the at least one voltage source to the at least one electrode based on the desired position of the film.

7. The valve of claim 1, wherein the at least one voltage source is a variable voltage source.

8. The valve of claim 1, wherein the first electrode is tapered to provide a varying voltage along the length of the first electrode.

9. The valve of claim 1, wherein,
    the at least one voltage source includes a first and a second voltage source and the at least one electrode includes a first and second electrode;
    the first voltage source being connected to the first electrode, the first electrode being associated with the aperture plate; and
    the second voltage source being connected to the second electrode, the second voltage source being associated with the opposing plate.

10. The valve of claim 1, wherein,
    the at least one electrode includes a first electrode and a second electrode and a first resistance layer connecting the first electrode and the second electrode; and
    the at least one voltage source includes a first voltage source applied to the first electrode and a second voltage source applied to the second electrode, the first and second voltage sources applying voltages which cause the voltage along the length of the first resistance layer to vary in order to continuously control the film position.

11. The valve of claim 10, wherein,
    the at least one electrode includes a third electrode and a fourth electrode and a second resistance layer connecting the third electrode and the fourth electrode; and
    the at least one voltage source includes a third voltage source applied to the third electrode and a fourth voltage source applied to the fourth electrode, the third and fourth voltage sources applying voltages causing the voltage along the length of the second resistance layer to vary in order to continuously control the film position, wherein the first resistance layer is associated with the aperture plate and the second resistance layer is associated with the opposing plate.

12. The valve of claim 1, wherein, the at least one electrode includes a plurality of first electrodes; and the at least one voltage source includes a first voltage source which provides a separate voltage to each of the first electrodes in order to discretely vary the position of the film based on the voltage applied to each of the first electrodes.

13. The valve of claim 12, wherein, the at least one electrode includes a plurality of second electrodes; and the at least one voltage source includes a second voltage source which provides a separate voltage to each of the second electrodes in order to discretely vary the position of the film based on the voltage applied to each of the second electrodes, wherein the first electrodes are associated with the aperture plate and the second electrodes are associated with the opposing plate.

14. The valve of claim 1, wherein, the at least one electrode includes a plurality of at least three first electrodes connected by a first resistance layer; and the at least one voltage source includes a first voltage source which applies a first voltage to each of the first electrodes which continuously varies the position of the film depending upon the voltage applied to each first electrode.

15. The valve of claim 14, wherein, the at least one electrode includes a plurality of at least three second electrodes connected by a second resistance layer; and the at least one voltage source includes a second voltage source which applies a second voltage to each of the second electrodes which continuously varies the position of the film depending upon the voltage applied to each second electrode, wherein the plurality of first electrodes are associated with the aperture plate and the plurality of electrodes are associated with the opposing plate.

16. A method for controlling fluid flow through a valve, comprising:

fixing a conductive flexible film between a first plate, the first plate defining an elongated first opening therethrough and a second plate positioned in spaced apart relationship to the first plate, the opposing plate defining a second opening therethrough;

associating a first electrode with the first plate;

attaching a first voltage source to the first electrode;

applying a first voltage to the first electrode which causes the film to move towards the first electrode; and maintaining the film in an intermediate position between a first opening blocked position and a first opening unblocked position using an applied voltage varying in response to sensed impedance of the conductive flexible film.

17. The valve of claim 1 controlled by the method comprising:

applying a voltage with the at least one voltage source to the at least one electrode; and changing the voltage applied to the at least one electrode in response to signals from a feedback control device from a fluid flow sensor.

\* \* \* \* \*